(12) United States Patent
Vangal et al.

(10) Patent No.: US 6,701,339 B2
(45) Date of Patent: Mar. 2, 2004

(54) PIPELINED COMPRESSOR CIRCUIT

(75) Inventors: Sriram R. Vangal, Hillsboro, OR (US); Dinesh Somasekhar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 09/733,482

(22) Filed: Dec. 8, 2000

(65) Prior Publication Data

US 2002/0070781 A1 Jun. 13, 2002

(51) Int. Cl.⁷ .................................................. G06F 7/52
(52) U.S. Cl. ...................................................... 708/709
(58) Field of Search ................................ 708/709, 620

(56) References Cited

U.S. PATENT DOCUMENTS

| | | | |
|---|---|---|---|
| 5,117,133 A | 5/1992 | Luebs | 307/471 |
| 5,612,632 A | 3/1997 | Mahant-Shetti et al. | 326/46 |
| 5,764,089 A | 6/1998 | Partovi et al. | 327/200 |
| 5,867,049 A | 2/1999 | Mohd | 327/200 |
| 5,898,330 A | 4/1999 | Klass | 327/210 |
| 5,900,759 A | 5/1999 | Tam | 327/201 |
| 5,978,827 A * | 11/1999 | Ichikawa | 708/709 |
| 6,060,910 A | 5/2000 | Inui | 326/98 |
| 6,121,807 A | 9/2000 | Klass et al. | 327/218 |
| 6,181,180 B1 | 1/2001 | Chen et al. | 327/211 |
| 6,242,952 B1 | 6/2001 | Bosshart et al. | 326/98 |
| 6,304,123 B1 | 10/2001 | Bosshart | 327/212 |
| 6,397,240 B1 * | 5/2002 | Fernando et al. | 708/603 |
| 6,437,602 B1 | 8/2002 | Friend et al. | 326/93 |
| 6,578,063 B1 * | 6/2003 | Kojima et al. | 708/708 |
| 6,584,485 B1 * | 6/2003 | Aoki et al. | 708/708 |

FOREIGN PATENT DOCUMENTS

| | | | |
|---|---|---|---|
| JP | 01-206717 | 8/1989 | H03K/3/037 |

OTHER PUBLICATIONS

"Power Saving Latch", *IBM Technical Disclosure Bulletin*, 39 (4), (Apr. 1996), pp. 65–66.

Beaumont–Smith, A., "Reduced Latency IEEE Floating–Point Standard Adder Architectures", *Proceedings of the 14th IEEE Symposium on Computer Arithmetic*, (1998), 8 pgs.

Elguibaly, F., "A Fast Parallel Multiplier–Accumulator Using the Modified Booth Algorithm", *IEEE Transactions on Circuits and Systems—II : Analog and Digital Signal Processing, 47* (9) (Sep. 2000), pp. 902–908.

Even, G, "On the Design of IEEE Compliant Floating Point Units", *IEEE Transactions on Computers, 49*(5), (May 2000), pp. 398–413.

Hokenek, E., "Second–Generation RISC Floating Point with Multiply—Add Fused", *IEEE Journal of Solid–State Circuits, 25* (5), (1990), pp. 1207–1213.

(List continued on next page.)

*Primary Examiner*—David H. Malzahn
(74) *Attorney, Agent, or Firm*—Schwegman, Lundberg, Woessner & Kluth, P.A.

(57) ABSTRACT

A pipelined four-to-two compressor includes sequential elements with embedded logic. One sequential element is a flip flop with complementary outputs that includes a master stage with embedded logic, a sensing stage, and one or more slave stages. The flip flop operates in a pre-charge state and an evaluate state. During the pre-charge state when a clock signal is low, the flip flop pre-charges internal keeper nodes to a high value. When the clock signal transitions high, the flip flop enters an evaluation state and one of the internal keeper nodes evaluates to a low value. Keeper nodes can also be dynamic flip flop outputs that pre-charge each clock cycle. Another flip flop with embedded logic receives the dynamic output, applies further logic, and provides a static output.

38 Claims, 7 Drawing Sheets

OTHER PUBLICATIONS

Ide, N, "2.44–GFLOPS 300–MHz Floating–Point Vector–Processing Unit for High–Performance 3–D Graphics Computing", *IEEE Journal of Solid–State Circuits, 35* (7), (Jul. 2000), pp. 1025–1033.

Lee, K.T., "1 GHz Leading Zero Anticipator Using Independent Sign–Bit Determination Logic", *Symposium on VLSI Circuits Digest of Technical Papers*, (2000), pp. 194–195.

Luo, Z., "Accelerating Pipelined Integar and Floating–Point Accumulations in Configurable Hardware with Delayed Addition Techniques", *IEEE Transactions on Computers, 49* (*3*), (Mar. 2000), pp. 208–218.

Panneerselvam, G., "Multiply–Add Fused RISC Architectures for DSP Applications", *IEEE Pac Rim*, (1993), pp. 108–111.

Goto, G., et al., "A 54 × 54–b Regularly Structured Tree Multiplier", *IEEE Journal of Solid–State Circuits*, vol. 27, 1229–1236, (Sep. 1992).

Klass, F., "Semi–Dynamic and Dynamic Flip–Flops with Embedded Logic", *Proceedings of the Symposium on VLSI Circuits, Digest of Technical Papers*, Honolulu, HI, IEEE Circuits Soc. Japan Soc. Appl. Phys. Inst. Electron., Inf. & Commun. Eng. Japan, pp. 108–109, (1998).

Partovi, H., et al., "Flow–Through Latch and Edge–Triggered Flip–Flop Hybrid Elements", *Proceedings of the IEEE International Solid–State Circuits Conference, Digest of Technical Papers and Slide Supplement*, NexGen Inc., Milpitas, CA, 40 pgs., (1996).

\* cited by examiner

US 6,701,339 B2

PIPELINED COMPRESSOR CIRCUIT

FIELD

The present invention relates generally to pipelined circuits, and more specifically to fast pipelined adder and compressor circuits.

BACKGROUND

Multiplication is one of the major operations in general purpose microprocessors and digital signal processors. The speed with which a multiplier circuit can operate often determines how fast a processor can be clocked.

A fast array multiplier is typically divided into two parts: a partial product summation tree, and a final adder. See G. Goto, T. Sato, M. Nakajima, & T. Sukemura, "A 54×54 Regularly Structured Tree Multiplier," IEEE Journal of Solid State Circuits, p. 1229, Vol. 27, No. 9, September, 1992.

The partial product summation tree takes up a significant portion of the total multiplication delay and is typically implemented using full adders arranged as three-to-two (3:2) compressors and four-to-two (4:2) compressors. For a discussion of compressors, see Neil H. E. Weste & Kamran Eshragihan, "Principles of CMOS VLSI Design: A Systems Perspective," $2^{nd}$ Ed., pp. 554–558 (Addison Wesley Publishing YEAR). Increasing the speed of compressors can increase the speed of partial product summation trees, multipliers, and entire integrated circuits.

For the reasons stated above, and for other reasons stated below which will become apparent to those skilled in the art upon reading and understanding the present specification, there is a need in the art for fast compressor circuits.

DESCRIPTION OF EMBODIMENTS

Figure 2:
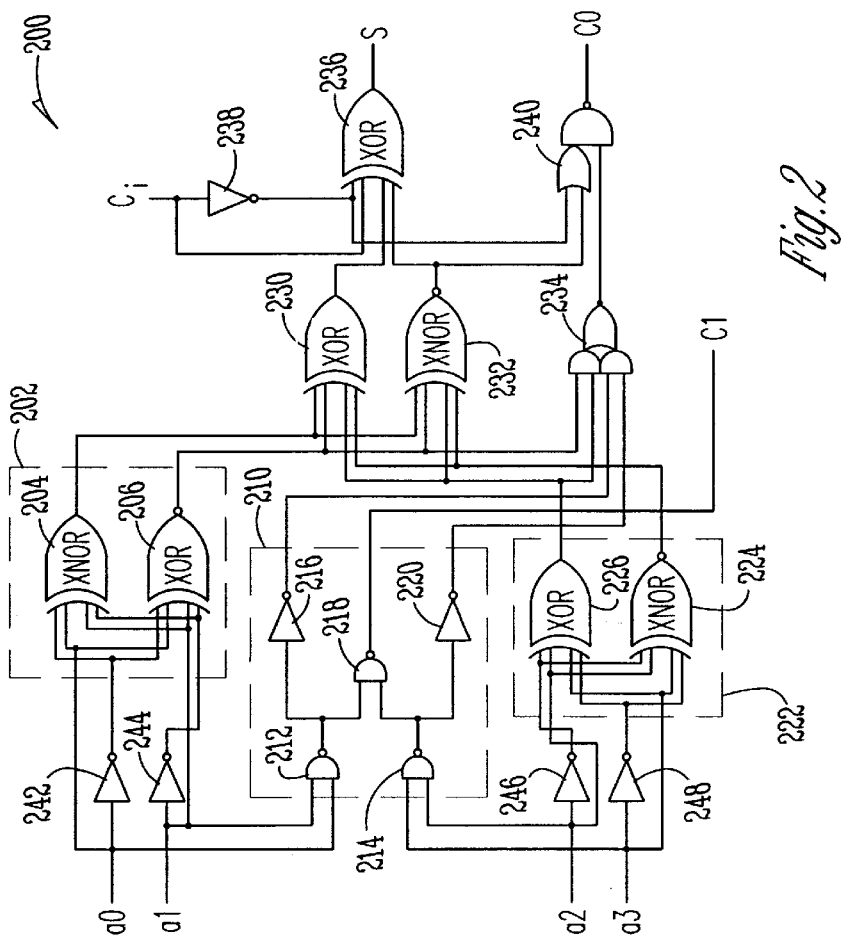
FIG. 2 shows a logic diagram of a four-to-two compressor.

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to pipeline compressors in multiplier circuits. A four-to-two compressor includes sequential elements with embedded logic. One sequential element is a flip flop with complementary outputs that includes a master stage with embedded logic, a sensing stage, and one or more slave stages. The flip flop operates in a pre-charge state and an evaluate state. During the pre-charge state when a clock signal is low, the flip flop pre-charges internal keeper nodes to a high value. When the clock signal transitions high, the flip flop enters an evaluation state and one of the internal keeper nodes evaluates to a low value. Keeper nodes can also be dynamic flip flop outputs that pre-charge each clock cycle. Another flip flop with embedded logic receives the dynamic output, applies further logic, and provides a static output.

Figure 1:
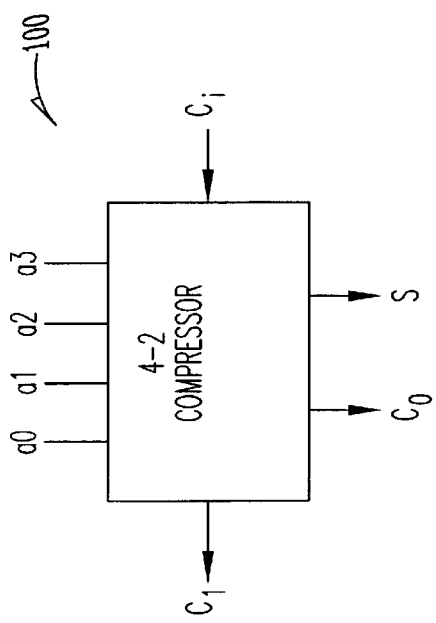
FIG. 1 shows a block diagram of a four-to-two compressor.

FIG. 1 shows a block diagram of a four-to-two (4–2) compressor. 4–2 compressor 100 accepts five input bits: four data bits shown as a0, a1, a2, and a3, and one carry bit shown as Ci. Compressor 100 counts the number of input bits with a logical "1," and generates output bits on the sum node (S), and two carry nodes (C0, C1). The number of input bits having a logical "1" is encoded by compressor 100 as 2(C1)+2(C0)+S.

Various embodiments of circuits are described herein with reference to circuit nodes having logical states of logical "1" or logical "0." Circuit nodes are also described as having high voltage and low voltage signals applied thereto. The terms logical "1" and logical "0" generally correspond to a high voltage and a low voltage, respectively. The "logical" terms are used when describing the logical operation of a circuit, and the "voltage" terms are generally used when describing the circuit more fully. One skilled in the art will understand that a logical inversion can take place while still practicing the present invention. A logical inversion would exist if the terms logical "1" and logical "0" corresponded to a low voltage and a high voltage, respectively.

FIG. 2 shows a logic diagram of a 4–2 compressor. Compressor 200 includes inverters 242, 244, 246, 248, 216, 220, and 238. Compressor 200 also includes NAND gates 212, 214, and 218, exclusive-or (XOR) gates 206, 226, 230, and 236, exclusive-nor (XNOR) gates 204, 224, and 232, and combination gates 234 and 240.

The sum output (S) is generated as an XOR of all five inputs, a0, a1, a2, a3, and Ci. In the embodiment of FIG. 2, The XOR and XNOR gates have differential inputs. For example, XNOR gate 204 receives a0 and a1, and also receives the complements of a0 and a1 as produced by inverters 242 and 244, respectively. The same is true of XOR gate 206.

XNOR gate 204 and XOR gate 206, taken together, make up logic block 202. Logic block 202 represents a fully differential XOR/XNOR gate. For example, each input is represented by two complementary signals, and the output includes two complementary signals. Likewise, logic block 222 represents a fully differential XOR/XNOR gate that includes XOR gate 226 and XNOR gate 224.

Logic block 210 includes NAND gates 212, 214, and 218, and inverters 216 and 220. NAND gate 212 and inverter 216 create an AND gate that drives combination gate 234.

Likewise, NAND gate 214 and inverter 220 also create an AND gate that drives combination gate 234. The combination of NAND gates 212, 214, and 218 generate the C1 carry output.

Logic blocks 202, 210, and 222 are in series with all possible signal paths from inputs, except for Ci, to outputs. That is to say, signals on each input, except for Ci, must travel through one or more of logic blocks 202, 210 and 222 before affecting an output. This organization is utilized in a pipelined 4–2 compressor as described with reference to FIG. 3.

Figure 3:
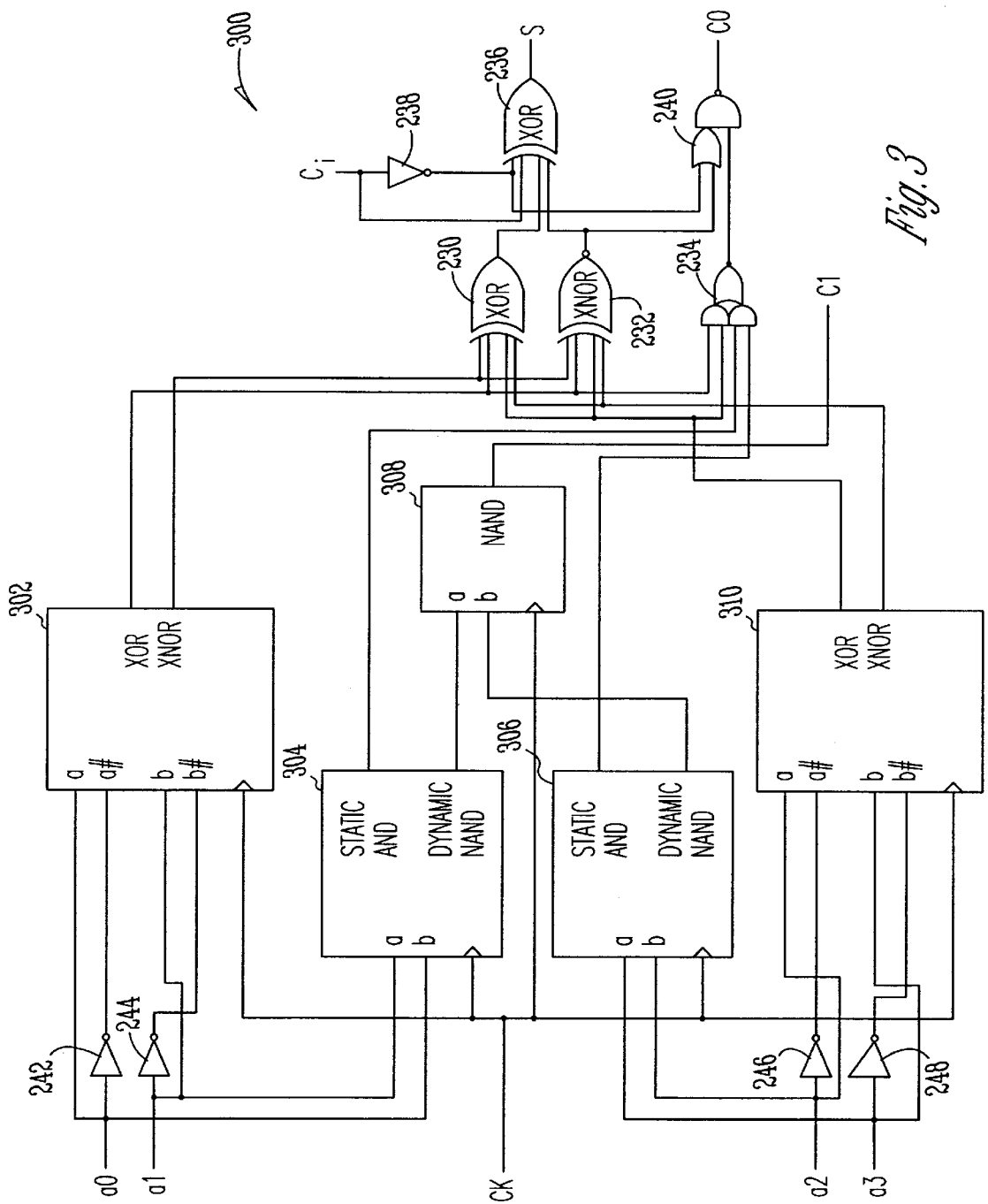
FIG. 3 shows a pipelined four-to-two compressor.

FIG. 3 shows a pipelined 4–2 compressor. Compressor 300 is similar to compressor 200 (FIG. 2) with the exception that logic blocks 202, 210, and 222 have been replaced by sequential elements. For example, compressor 300 includes flip flops 302 and 310 where compressor 200 includes logic blocks 202 and 222 respectively. Also for example, compressor 300 includes flip flops 304, 306, and 308 where compressor 200 includes logic block 210.

Figure 4:
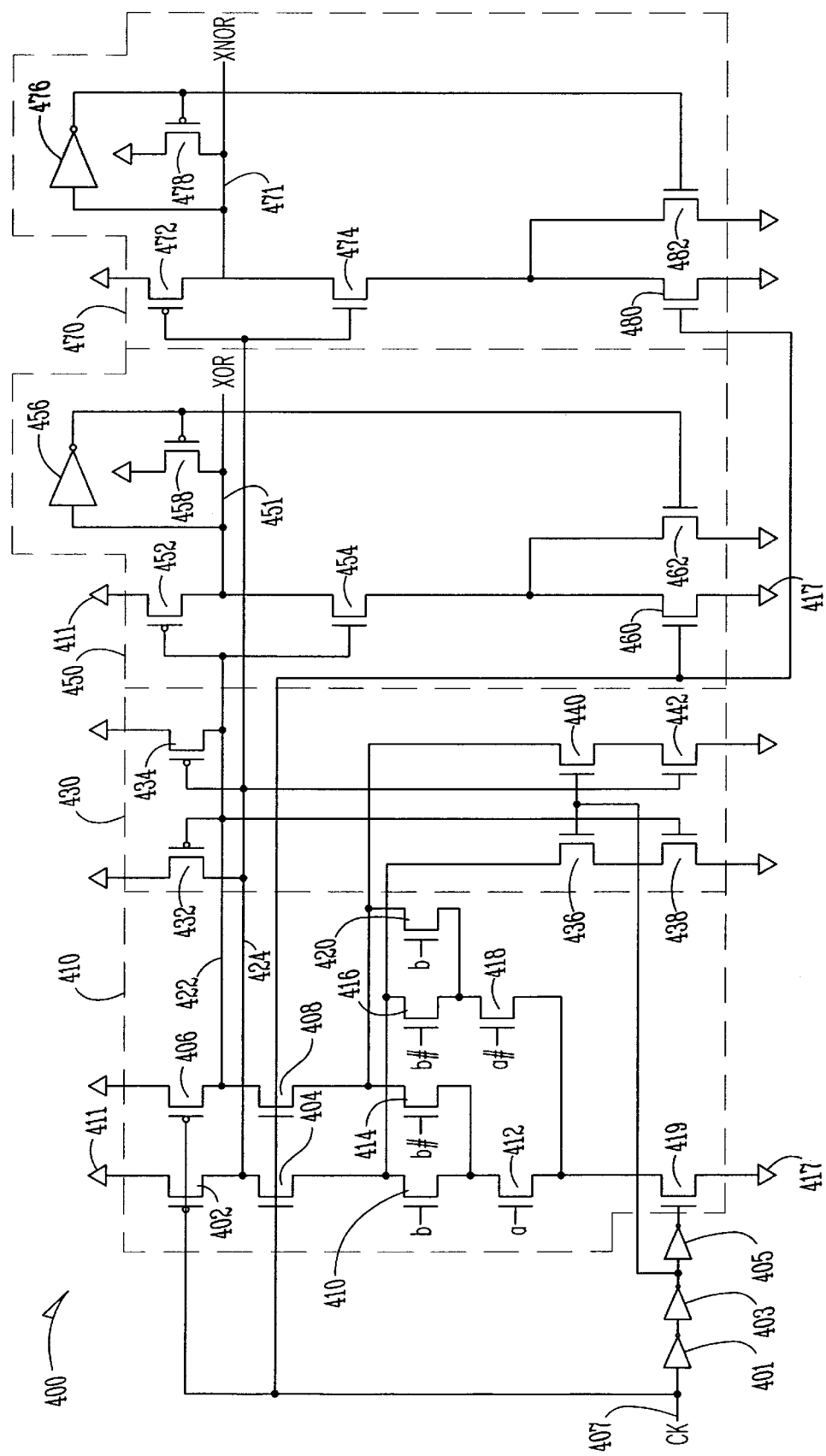
FIG. 4 shows a dual-rail flip flop with an embedded logic function.

Flip flops 302 and 310 are fast flip flops with embedded logic. An example embodiment of these flip flops is shown in FIG. 4. Flip flops 302 and 310 are fully differential flip flops that are sometimes referred to as "dual-rail" flip flops. They are fully differential because they receive complementary inputs and produce complementary outputs. For example, flip flop 302 receives the "true" and "complement" of a0 on input nodes labeled "a" and "a#," respectively. Also for example, the true and complement of a1 are received on nodes labeled "b" and "b#," respectively, and complementary outputs are generated on nodes labeled "XOR" and "XNOR."

Flip flops 304 and 306 receive single-ended input signals and produce complementary outputs. Flip flops 304 and 306 produce a "static" AND output and a "dynamic" NAND output. The terms "static" and "dynamic," as used in this context, refer to the behavior of the output signals between transitions. For example, a signal that changes on a single edge of the clock signal is referred to as static, and a signal that returns to a known state on one phase of the clock signal regardless of the current signal value is referred to as dynamic.

Flip flop 304 has a static AND output and a dynamic NAND output. The static AND output produces a signal on every rising edge of the clock signal CK that is the logical AND of a0 and a1. The dynamic NAND output "pre-charges" to a logical "1" during each low period of the clock signal CK, and evaluates to the NAND of a0 and a1 when the CK transitions high. The dynamic nature of the NAND output and the pre-charge cycle are described more fully with reference to the following figures. Flip flop 306 operates in the same fashion as flip flop 304.

Flip flop 308 receives dynamic outputs from flip flops 304 and 306, and has a static NAND output. Flip flop 308 receives the CK signal, as do flip flops 304 and 306. Even though flip flops 304 and 308 appear cascaded, only a single clock delay is created by the combination. The dynamic nature of the signals between flip flops 304, 306, and 308 allow the output of flip flop 308 to changes on the same clock edge as the static outputs of flip flops 302 and 310. This operation is explained in more detail with reference to the following figures.

Flip flops 302, 304, 306, 308, and 310 each include sequential elements with embedded logic. As a result, compressor 300 is a pipelined compressor with a pipeline delay of one clock. By inserting sequential elements with embedded logic inside of the compressor, rather than inserting flip flops at the input or output, overall delay can be significantly decreased.

FIG. 4 shows a dual-rail flip flop with an embedded logic function. Flip flop circuit 400 includes master stage 410, sense stage 430, and slave stages 450 and 470. Master stage 410 includes transistors 402 and 404 coupled between an upper voltage supply node 411 and a logic function made up of transistors 410, 412, 416, and 418. Master stage 410 also includes transistors 406 and 408 coupled between upper voltage supply node 411 and a logic function made up of transistors 414, 412, 420, and 418. Transistor 419 is coupled in series between the logic functions and lower voltage supply node 417. Master stage 410 drives "keeper" nodes 422 and 424, the operation of which is described more fully below.

Sense stage 430 includes p-channel transistors 432 and 434, and n-channel transistors 436, 438, 440, and 442. Slave stage 450 includes transistors 452, 454, and 460 coupled in series between nodes 411 and 417, and also includes transistors 458 and 462 and inverter 456. Slave stage 470 includes transistors 472, 474, and 480 coupled in series between nodes 411 and 417, and also includes transistors 478 and 482 and inverter 476. Flip flop circuit 400 also includes a clock inverting stage that includes series connected inverters 401, 403, and 405, that drives the gates of transistors 419, 436, and 440.

Clock signal CK is coupled to a clock input node 407, which is connected to the gates of transistors 404, 408, 460 and 480, and inverter 401 of the clock inverting stage. Series connected inverters 401, 403, and 405 are connected in series between node 407 and the gate of transistor 419, which receives an inverted and delayed version of the clock signal CK. Master stage 410 receives input data on logic input nodes labeled "a," "a#," "b," and "b#." These nodes correspond to the inputs of flip flops 302 and 310 (FIG. 3).

Flip flop circuit 400 includes transistors that form latches under certain conditions. One latch is formed by the combination of inverter 456 and transistors 458 and 462. When transistor 454 is on, transistors 458 and 462 form an inverter that is cross-coupled with inverter 456, thereby forming a latch. A similar arrangement exists with inverter 476 and transistors 478, 482, and 474 within slave stage 470. Sense stage 430 also includes a latch that is formed under certain conditions. Transistors 434 and 442 form a first inverter when transistors 440 and 408 are on, and transistors 432 and 438 form an inverter cross-coupled with the first inverter when transistors 436 and 404 are on.

Each of the aforementioned latches includes at least one inverter that has a control transistor in series with a pullup and pulldown transistor. For example, the inverter formed by transistors 458 and 462 includes transistor 454 in series, and the inverter formed by transistors 434 and 442 includes control transistors 440 and 408 in series. Control transistors are also referred to as "clocked" transistors, and inverters that include clocked transistors are referred to as "clocked" inverters. Gates of clocked transistors are "control input nodes" of the clocked inverters.

Only when the clocked transistors are on do the clocked inverters function as normal inverters. When operating as a normal inverter, a clocked inverter produces a high output for a low input, and produces a low output for a high input. When a signal on the control input node of a clocked inverter is at a logic zero, the clocked inverter does not drive the output low for a high input. In these embodiments, when a high signal is on the control input of the clocked inverter, the latch will retain its value even if decoupled from the remainder of the circuit, since the cross-coupled inverters create a loop that holds the present value at the input to both of the cross-coupled inverters.

Transistors 402 and 406, in the embodiment of FIG. 4, are examples of p-type transistor switches which are closed (on) between their source and drain when their gate is at a low potential, and which are open (off) between their source and drain when their gate is at a high potential. Transistors 404, 410, and 412, in the embodiment of FIG. 4, are examples of n-type transistor switches which are closed (on) between their source and drain when their gate is at a high potential, and which are open (off) between their source and drain when their gate is at a low potential.

In operation, as the clock signal transitions between a logical one and a logical zero, flip flop 400 repeatedly transitions back and forth between two states: a pre-charge state, and an evaluate state. In the pre-charge state, achieved when clock signal CK is in a low state and has been in a low state for a sufficient period of time for all outputs and internal nodes to stabilize at a steady state level, transistors 402, 406 and 419 are on, and transistors 404 and 408 are off. In this pre-charge state, keeper nodes 422 and 424 are "pre-charged" to a high potential through transistors 406 and 402, respectively. Transistors 402 and 406 are referred to as a pre-charge transistors.

On the rising edge of clock C, flip flop circuit 400 enters the evaluate state. Transistors 402 and 406 turn off, and transistors 404 and 408 turn on. Transistor 419 remains on for the delay period of the clock inverting stage that includes the three inverters 401, 403, and 405, and then shuts off. As a result, transistors 404, 408, and 419 are all on for the delay period of the clock inverting stage. If the logic inputs "a," "a#," "b," and "b#" satisfy one of the logic functions in master stage 410, either node 422 or 424 is discharged to logic zero. Either node 422 or 424 is said to "evaluate" to zero, and transistors 404, 408, and 419 are referred to as "evaluation" transistors. When clock signal CK transitions back to low, the flip flop transitions back to the pre-charge state. Transistors 402 and 406 turn back on and nodes 422 and 424 are pre-charged back high.

Two complementary logic functions exist within master stage 410. The complementary logic functions of flip flop circuit 400 are implemented by a stack of n-channel transistors that includes transistors 410, 412, 414, 416, 418, and 420. During evaluation, node 422 evaluates to zero if the XOR of "a" and "b" is satisfied, and node 424 evaluates to zero if the XNOR of "a" and "b" is satisfied. Both keeper nodes 422 and 424 are pre-charged to a high state, but during evaluation, are driven to opposite states by virtue of the complementary logic functions.

Within master stage 410, pre-charge transistor 402 and evaluation transistor 404 form a complementary pair of transistors that drive keeper node 424. Likewise, pre-charge transistor 406 and evaluation transistor 408 form a complementary pair of transistors that drive keeper node 422. Each of the complementary transistor pairs corresponds to one of the complementary logic functions described above. For example, complementary pair of transistors 402 and 404 correspond to the XNOR of "a" and "b," and complementary pair of transistors 406 and 408 correspond to the XOR of "a" and "b." In the embodiment of FIG. 4, both logic functions are coupled to evaluation transistor 419. In other embodiments, each logic function has a dedicated evaluation transistor coupling it to the lower supply node.

Sense stage 430 includes pullup transistors 432 and 434, clocked transistors 436 and 440, and pulldown transistors 438 and 442. Sense stage 430 also shares evaluation transistors 408 and 404 with master stage 410. Pullup transistor 432 and pulldown transistor 438 form a clocked inverter with evaluation transistor 404 and clocked transistor 436 coupled in series between them. Likewise, pullup transistor 434 and pulldown transistor 442 form an clocked inverter with evaluation transistor 408 and clocked transistor 440 between them.

The two clocked inverters in sense stage 430 are not enabled during the precharge state. For example, during the pre-charge state, both keeper nodes 422 and 424 are pre-charged high and pullup transistors 432 and 434 are off. The clock signal CK is low and transistors 404, 408, 436, and 440 are also off. As a result, during the pre-charge state, sense stage 430 does not influence the state of keeper nodes 422 and 424.

During the evaluation state, sense stage 430 senses the state to which each of keeper nodes 422 and 424 is evaluating, and then drives the keeper nodes further into those states. For example, when the clock signal CK transitions high, evaluation transistors 404 and 408 turn on and one of keeper nodes 422 and 424 begins to evaluate to zero. This analysis assumes stable data input values at the logic function in the stack of n-channel transistors. After the delay time of inverters 102 and 104, clocked transistors 436 and 440 turn on, and the clocked inverters in sense stage 430 begin to operate. One of keeper nodes 422 and 424 is still high and the other is evaluating to zero. The keeper node that is high drives one of the inverters in sense stage 430 and causes the other keeper node to evaluate to zero more quickly. For example, assuming that the logic function causes keeper node 424 to evaluate to zero and keeper node 422 to remain pre-charged, when clocked transistors 436 and 440 turn on, the inverter formed by pullup transistor 432 and pulldown transistor 438 drives keeper node 424 to zero faster.

Clocked transistors 436 and 440 are driven by a non-inverted, delayed clock signal. The delayed clock provides "sensing" of the evaluated states of the keeper nodes and causes them to reach their final evaluated state faster. Once the evaluation state is fully entered, and steady state is reached with the clock signal CK high, sense stage 430 includes cross-coupled inverters that form a latch between complementary keeper nodes 422 and 424. It is not necessary to drive the gates of clocked transistors 436 and 440 with the delayed clock signal as shown in FIG. 4. Any signal that turns on clocked transistors 436 and 440 at an appropriate point in the evaluation can be utilized without departing from the scope of the present invention.

Slave stage 450 includes pullup transistor 452, pulldown transistor 454, and clocked transistor 460. A latch on the output of slave stage 450 includes forward inverter 456 cross-coupled with a clocked feedback inverter that includes pullup transistor 458, pulldown transistor 462, and shared transistor 454. Output node 451 of slave stage 450 is the XOR of the logic inputs to master stage 410.

Slave stage 470 includes pullup transistor 472, pulldown transistor 474, and clocked transistor 480. A latch on the output of slave stage 470 includes forward inverter 476 cross-coupled with a clocked feedback inverter that includes pullup transistor 478, pulldown transistor 482, and shared transistor 474. Output node 471 of slave stage 470 is the XNOR of the logic inputs to master stage 410.

During the pre-charge state, nodes 422 and 424 are high, so pullup transistors 452 and 472 are off. As a result, output nodes 451 and 471 hold the previous output state. During evaluation, when one of nodes 422 and 424 evaluate low, the corresponding slave stage output node is driven high. For example, if node 422 evaluates low, then transistor 452 turns on and output node 451 is driven high. The state of the slave stage output nodes can only change during evaluation, and not during pre-charge.

Master stage 410 is referred to as a "dynamic" master stage, in part because output nodes 422 and 424 of master stage 410 return to a pre-charge state on every clock cycle. Slave stages 450 and 470 are referred to as "static" slave stages, in part because output nodes 451 and 471 remain static during each clock cycle. The combination of the dynamic master stage and static slave stage is referred to as a "semi-dynamic" flip flop circuit. Flip flop circuit 400 is also referred to as a "dual-rail" flip flop because it produces complementary outputs. The complementary outputs and the embedded logic functions allow the fast generation of complementary flip flop output signals.

Figure 5:
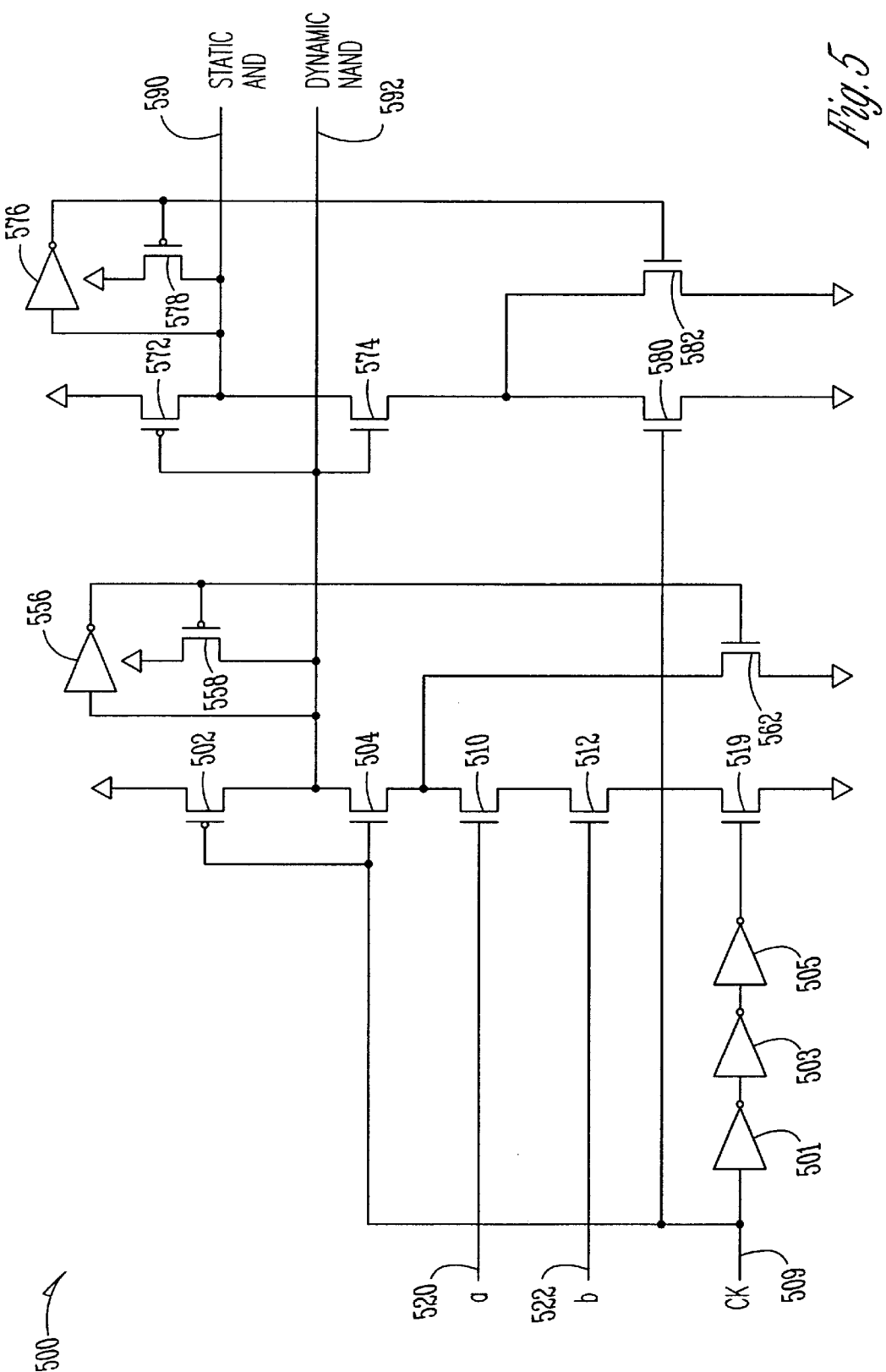
FIG. 5 shows a flip flop with embedded logic and complementary outputs.

FIG. 5 shows a flip flop with embedded logic and complementary outputs. Flip flop circuit 500 receives two logic input signals "a" and "b," and a clock signal C, and produces a static AND output signal and a dynamic NAND output signal. Logic input signals are received on nodes 520 and 522, respectively. The clock signal CK is received on node 509. The static AND output signal is produced on node 590, and the dynamic NAND signal is produced on node 592. Node 592 is also a keeper node driven by master stage within flip flop circuit 500. Flip flop circuit 500 is a flip flop circuit that can be utilized as flip flops 304 and 306 (FIG. 3).

Flip flop circuit 500 includes a master stage that drives keeper node 592. The master stage includes transistors 502, 504, 510, 512, and 519. P-channel transistor 502 is a pre-charge transistor, and n-channel transistors 504 and 519 are evaluation transistors. A NAND logic function is created by n-channel transistors 510 and 512 series connected between evaluation transistors 504 and 519. During pre-charge, keeper node 592 pre-charges high, and during evaluation, keeper node 592 evaluates low when both logic input signals "a" and "b" are high.

Two latches are formed within flip flop circuit 500, each having a clocked inverter. A first latch is formed by inverter 556 and the combination of transistors 558, 504, and 562. This latch is coupled to keeper node 592. A second latch is formed by inverter 576 and the combination of transistors 578, 574, and 582.

A single slave stage is included in flip flop circuit 500. The slave stage includes a complementary pair of transistors including transistors 572 and 574, and clocked transistor 580. The operation of the slave stage of flip flop circuit 500 is the same as the slave stages of flip flop circuit 400 (FIG. 4).

As previously stated, flip flop circuit 500 includes both static and dynamic output signals. The static AND signal on node 590 changes at most once per clock period of clock signal CK. The dynamic NAND signal on the keeper node (which is exposed as an output node) is pre-charged each cycle of the clock signal CK.

Figure 6:
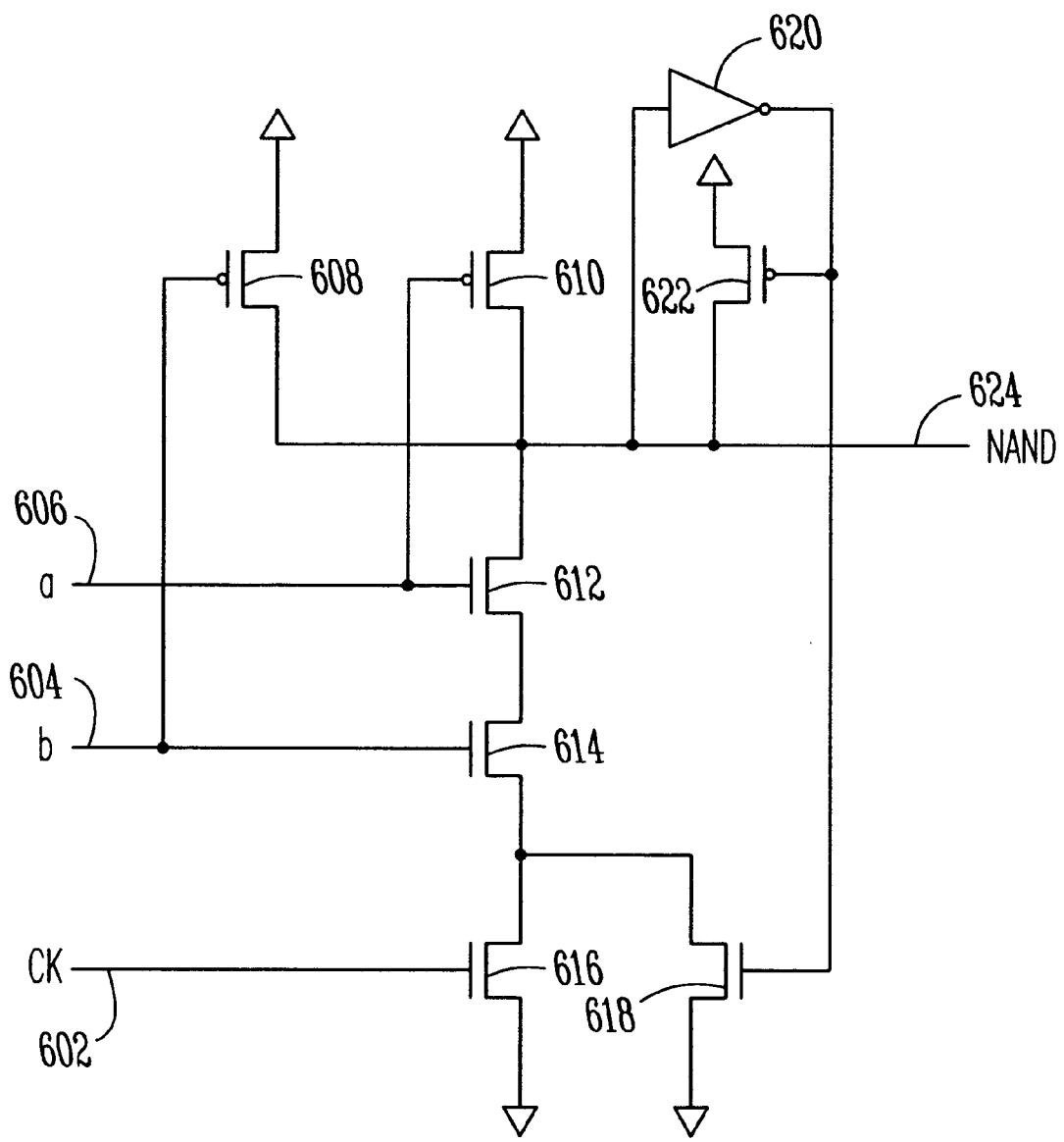
FIG. 6 shows a flip flop with dynamic inputs, embedded logic, and a static output.

FIG. 6 shows a flip flop circuit with dynamic inputs, embedded logic, and a static output. Flip flop circuit 600 receives logic input signals "a" and "b" on nodes 606 and 604, respectively, and also receives clock signal CK on node 602. A static NAND output signal is produced on node 624. Flip flop circuit 600 is a flip flop embodiment that can be used as flip flop 308 (FIG. 3).

Because logic input signals "a" and "b" are dynamic, they are pre-charged when clock signal CK is low. When CK is low, p-channel transistors 608 and 610 are off, and n-channel transistors 612 and 614 are on. When the clock signal CK transitions high, the NAND output signal is driven low if both "a" and "b" inputs are high, and is driven high if one or both of the "a" and "b" inputs are low.

A latch is formed on the output of flip flop circuit 600 by inverter 620 and the combination of transistors 622 and 618. This latch holds the value on output node 624 during rising edge transitions of the clock signal CK. The NAND output on node 624 is, therefore, referred to as "static."

When flip flop circuit 600 is cascaded with a flip flop having dynamic outputs, such as flip flop circuit 500 (FIG. 5), the NAND output signal on node 624 changes once per clock cycle as a function of the logic inputs of the previous stage. For example, referring now back to FIGS. 2 and 3, logic block 210 is implemented with flip flops 304, 306, and 308. Flip flops 304 and 306 receive the logic inputs of logic block 210, and flip flops 304, 306, and 308 all produce static outputs of logic block 210. On each rising edge of clock signal CK, the static outputs of flip flops 304, 306, and 308 all change to reflect the state of the logic inputs of flip flops 304 and 306. The combined pipeline effect of flip flops 304, 306, and 308 is to insert a single pipeline delay at the location of logic block 210.

Figure 7:
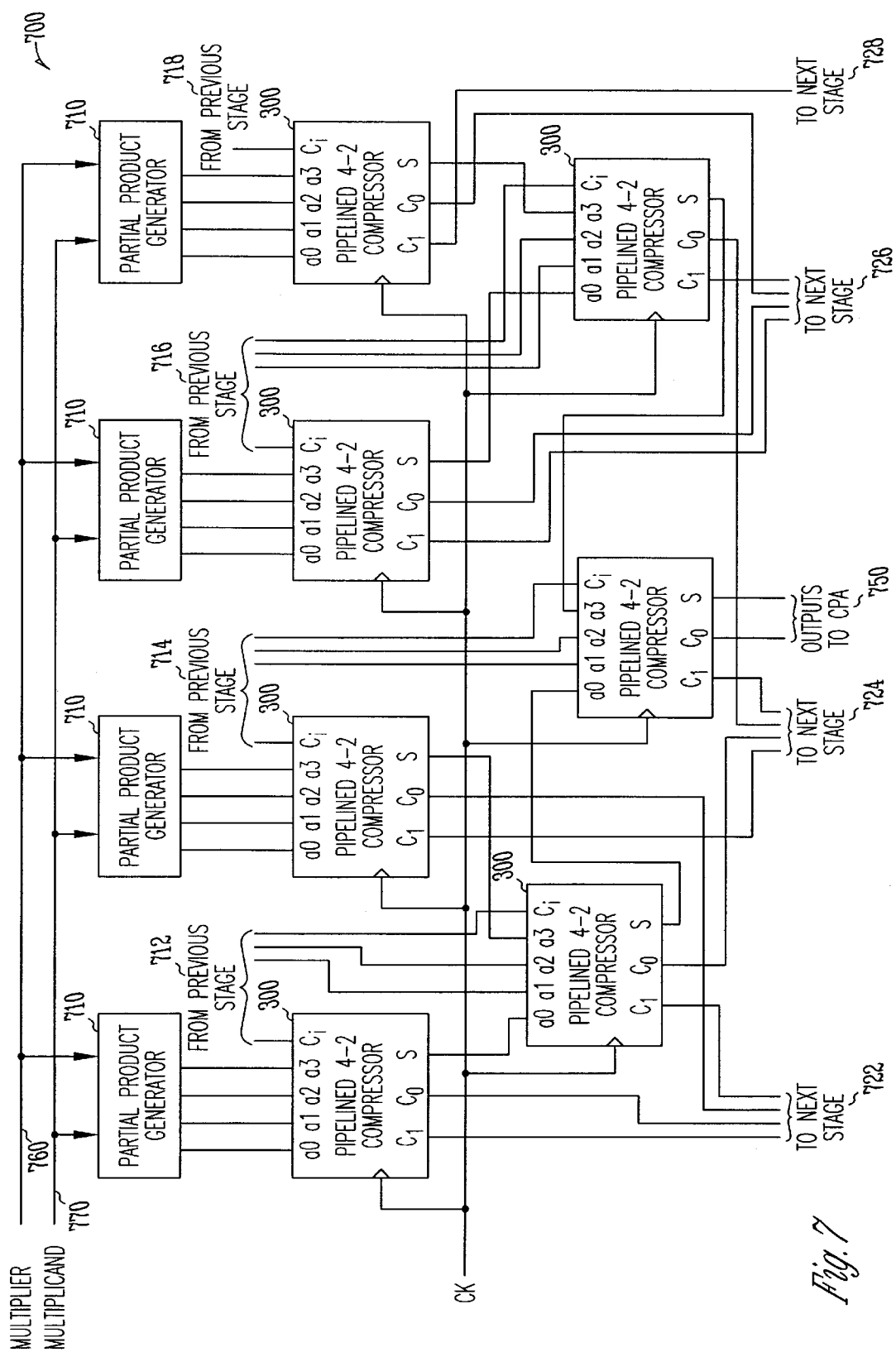
FIG. 7 shows a pipelined compressor tree.

FIG. 7 shows a pipelined compressor tree. Pipelined compressor tree 700 includes a plurality of pipelined compressors 300 arranged to sum partial products generated by partial product generators 710. Partial product generators 710 receive a multiplicand on node 770, and a multiplier on node 760, and produce single bit partial products to be summed by pipelined compressors 300.

Pipelined compressor tree 700 produces outputs 750 that are sent to a carry propagate adder (CPA). Pipelined compressor tree 700 also produces carry signals 722, 724, 726, and 728 that are sent to the next more significant stage. These carry signals are received by the next stage at inputs 712, 714, 716, and 718.

Pipelined compressors 300 receive clock signal CK to clock sequential elements such as flip flops 302, 304, 306, 308, and 310 (FIG. 3) that are included within pipelined compressor 300. Pipelined compressors 300 are summation circuits that sum the partial products, which are bits of the same of the same weight. In the embodiments shown and described, pipelined compressors 300 are 4–2 compressors. In other embodiments, pipelined compressors are 3–2 compressors. In still other embodiments, pipelined compressors 300 are other summation circuits that include sequential elements with embedded logic.

Figure 8:
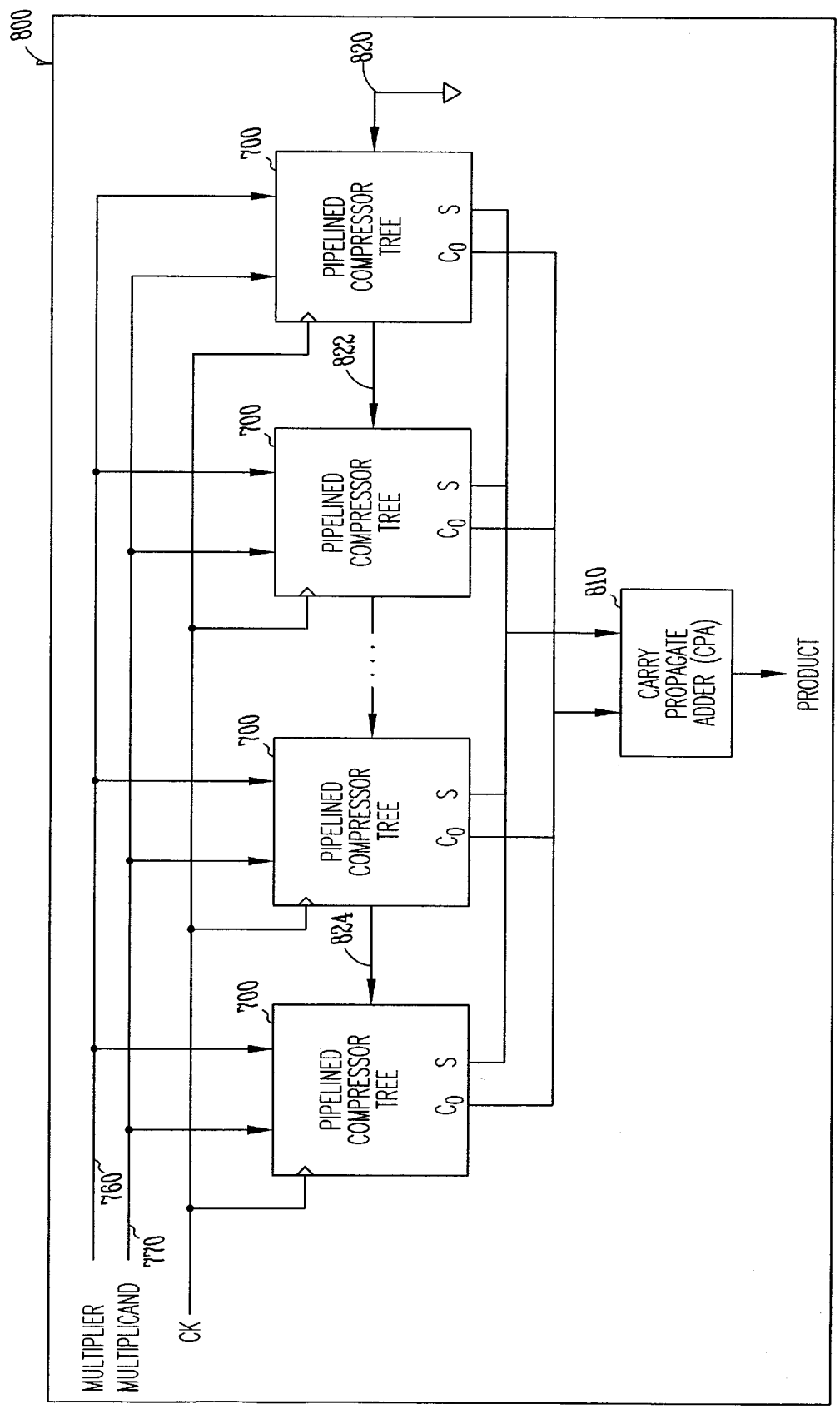
FIG. 8 shows an integrated circuit with a multiplier.

FIG. 8 shows an integrated circuit with a multiplier. Integrated circuit 800 includes a plurality of pipelined compressor trees 700. Each of pipelined compressor trees 700 receives a part of a multiplicand on node 770 and a part of a multiplier on node 760, and produces carry and sum signals that are sent to carry propagate adder (CPA) 810. Each pipelined compressor receives clock signal CK to clock internal sequential elements, receives carry signals from a previous stage, and produces carry signals for the next stage. For example, the least significant pipelined compressor tree receives zeros on node 820 as carry in signals, and produces carry signals on node 822 for the next significant stage. The most significant pipelined compressor tree receives carry signals from the previous stage on node 824. CPA 810 receives the outputs from pipelined compressor trees 700, and produces the product of the multiplicand and the multiplier.

The multiplier implemented within integrated circuit 800 includes pipelined 4–2 compressors to increase the clock speed at which the multiplier can operate. By including flip flops with embedded logic, pipeline stages can be inserted at nodes internal to the 4–2 compressors rather than at their boundaries, and increased clock speeds result.

Integrated circuit 800 can be any type of integrated circuit capable of including a multiplier. For example, integrated circuit 800 can be a processor such as a microprocessor, a digital signal processor, a micro controller, or the like. Integrated circuit 800 can also be an integrated circuit other than a processor such as an application-specific integrated circuit (ASIC), a communications device or a memory controller.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed:

1. A four-to-two compressor circuit comprising:
   input nodes to receive partial products;
   output nodes to provide sum and carry signals; and
   a flip-flop circuit coupled between the input nodes and output nodes, the flip flop circuit including an embedded logic function to generate the sum and carry signals.

2. The four-to-two compressor of claim 1 wherein the flip-flop circuit further comprises:
   a master stage, the master stage including a stack of transistors to implement the embedded logic function; and
   a slave stage responsive to the master stage.

3. The four-to-two compressor of claim 2 wherein the embedded logic function comprises an exclusive-or gate.

4. The four-to-two compressor of claim 2 further comprising a sense stage coupled between the master stage and the slave stage.

5. The four-to-two compressor of claim 2 wherein the embedded logic function includes a true logic function and a complementary logic function.

6. The four-to-two compressor of claim 2 wherein the flip flop circuit further comprises a keeper node driven by the master stage, the keeper node also being a dynamic output node, and wherein the slave stage drives a static output node in response to the keeper node.

7. The four-to-two compressor of claim 6 further comprising:
   a second flip flop circuit to produce a static output signal, the second flip flop circuit including a second embedded logic function responsive to the dynamic output node.

8. The four-to-two compressor circuit of claim 2 wherein the flip flop circuit further comprises:
   a static output node to drive a first signal that changes once during each period of a clock signal; and
   a dynamic output node to drive a second signal that pre-charges during one half of each period of the clock signal.

9. The four-to-two compressor of claim 8 wherein:
   the dynamic output node is an output node of the master stage; and
   the static output node is an output node of the slave stage.

10. The four-to-two compressor circuit of claim 8 wherein:
    the static output node provides an AND function output; and
    the dynamic output node provides a NAND function output.

11. The four-to-two compressor circuit of claim 8 further comprising:
    a second flip flop circuit responsive to the dynamic output node, the second flip flop circuit including an embedded logic function.

12. A four-to-two compressor circuit comprising:
    input nodes to receive partial products;
    output nodes to provide sum and carry signals; and
    a flip-flop circuit coupled between the input nodes and output nodes, the flip flop circuit including:
       an embedded logic function to generate the sum and carry signals, wherein the embedded logic function includes a true logic function and a complementary logic function;
       a master stage, the master stage including:
          a stack of transistors to implement the embedded logic function;
          a first pre-charge transistor coupled between a first keeper node and an upper power supply node; and
          a first evaluation transistor coupled between the first keeper node and the true logic function; and
       a slave stage responsive to the master stage.

13. The four-to-two compressor of claim 12 wherein the embedded logic function comprises an exclusive-or gate.

14. The four-to-two compressor of claim 12 further comprising a sense stage coupled between the master stage and the slave stage.

15. The four-to-two compressor of claim 12 wherein the master stage further comprises:
    a second pre-charge transistor coupled between a second keeper node and the upper power supply node; and
    a second evaluation transistor coupled between the second keeper node and the complementary logic function.

16. The four-to-two compressor of claim 12 wherein the flip flop circuit further comprises a keeper node driven by the master stage, the keeper node also being a dynamic output node, and wherein the slave stage drives a static output node in response to the keeper node.

17. The four-to-two compressor of claim 16 further comprising:
    a second flip flop circuit to produce a static output signal, the second flip flop circuit including a second embedded logic function responsive to the dynamic output node.

18. The four-to-two compressor circuit of claim 12 wherein the flip flop circuit further comprises:
    a static output node to drive a first signal that changes once during each period of a clock signal; and
    a dynamic output node to drive a second signal that pre-charges during one half of each period of the clock signal.

19. The four-to-two compressor of claim 18 wherein:
    the dynamic output node is an output node of the master stage; and
    the static output node is an output node of the slave stage.

20. The four-to-two compressor circuit of claim 18 wherein:
    the static output node provides an AND function output; and
    the dynamic output node provides a NAND function output.

21. The four-to-two compressor circuit of claim 18 further comprising:

a second flip flop circuit responsive to the dynamic output node, the second flip flop circuit including an embedded logic function.

22. A multiplier circuit comprising:

a plurality of partial product generators to generate partial products; and a plurality of pipelined compressors to sum the partial products, wherein at least one of the plurality of pipelined compressors includes a sequential element having embedded logic.

23. The multiplier circuit of claim 22 wherein the plurality of pipelined compressors are four-to-two compressors.

24. The multiplier circuit of claim 22 wherein the sequential element having embedded logic comprises:

a master stage including logic input nodes; a clock input node, a stack of transistors to implement the embedded logic, and an output node coupled to a keeper node; and a slave stage responsive to the keeper node.

25. The multiplier circuit of claim 24 wherein the embedded logic comprises:

a true logic function to drive the keeper node;

a second keeper node; and a complementary logic function to drive the second keeper node.

26. The multiplier circuit of claim 25 wherein the sequential element further comprises a sense stage coupled to the keeper node and the second keeper node, the sense stage including two clocked inverters.

27. The multiplier circuit of claim 24 wherein the slave stage includes a complementary pair of transistors having gates coupled to the keeper node, a static output node of the sequential element being defined at a junction between the complementary pair of transistors.

28. The multiplier circuit of claim 27 wherein a dynamic output node of the sequential element is formed by the keeper node.

29. The multiplier circuit of claim 28 wherein at least one of the plurality of pipelined compressors includes a second sequential element, the second sequential element being responsive to the dynamic output node.

30. An integrated circuit comprising:

a summation circuit to sum a plurality of bits of the same weight, the summation circuit including at least one flip flop circuit having embedded complementary logic functions.

31. The integrated circuit of claim 30 wherein the complementary logic functions comprise an exclusive-or logic function and an exclusive-nor logic function.

32. The integrated circuit of claim 30 wherein the at least one flip flop circuit comprises:

a master stage to drive a keeper node;

a sense stage coupled to the keeper node; and a slave stage coupled to the keeper node.

33. The integrated circuit of claim 32 wherein the master stage comprises:

a clock input node;

a clock inverting stage to produce a delayed inverted clock on a second clock node;

a pre-charge transistor coupled between the keeper node and an upper power supply node, the pre-charge transistor having a gate coupled to the clock input node;

a first evaluation transistor coupled between the keeper node and the embedded complementary logic functions, the evaluation transistor having a gate coupled to the clock input node; and a second evaluation transistor coupled between the embedded complementary logic functions and a lower power supply node, the second evaluation transistor having a gate coupled to the second clock node.

34. The integrated circuit of claim 33 wherein the integrated circuit comprises a digital signal processor.

35. The integrated circuit of claim 33 wherein the integrated circuit comprises a microprocessor.

36. The integrated circuit of claim 30 wherein the summation circuit further comprises a second flip flop circuit having a static output and a dynamic output, the dynamic output being configured to pre-charge every half clock cycle.

37. The integrated circuit of claim 36 wherein the summation circuit further comprises a third flip flop circuit responsive to the dynamic output, the third flip flop circuit having a static output.

38. The integrated circuit of claim 36 wherein the third flip flop circuit includes an embedded logic function responsive to the dynamic output.

* * * * *